United States Patent [19]
Lee

[11] Patent Number: 5,248,897
[45] Date of Patent: Sep. 28, 1993

[54] SAFETY WINDOW FOR CAR

[76] Inventor: Yong-Koo Lee, 448-31, Seokyo-Kong, Mapo-Ku, Seoul, Rep. of Korea

[21] Appl. No.: 832,215

[22] Filed: Feb. 6, 1992

[30] Foreign Application Priority Data

Feb. 7, 1991 [KR] Rep. of Korea .............. 91-1904

[51] Int. Cl.[5] .......................... H02P 5/00; B60L 3/00
[52] U.S. Cl. .................................... 307/10.1; 180/281; 318/461; 318/463
[58] Field of Search ............. 307/120, 9.1, 10.1; 318/461, 463, 466, 456, 460, 280–286; 49/43, 118, 138; 296/223; 160/7, 29, 296; 180/281

[56] References Cited

U.S. PATENT DOCUMENTS

| | | | |
|---|---|---|---|
| 4,278,922 | 7/1981 | Grebe | 318/264 |
| 4,371,864 | 2/1983 | Kawasaki et al. | 180/281 |
| 4,821,836 | 4/1989 | Evans | 180/281 |
| 4,835,449 | 5/1989 | Huehn | 318/282 |
| 4,870,333 | 9/1989 | Itoh et al. | 318/286 |
| 5,113,427 | 5/1992 | Ryoichi et al. | 307/10.1 |

FOREIGN PATENT DOCUMENTS 3512117 10/1986 Fed. Rep. of Germany .

Primary Examiner—Marc S. Hoff
Assistant Examiner—Richard T. Elms
Attorney, Agent, or Firm—Lawrence M. Nawrocki

[57] ABSTRACT

A safety window for a car which is capable of being automatically moved to its window closing position when the car speed exceeds a predetermined speed. The safety window comprises a control device for controlling the operation of the power window, which comprises a sensor for detecting a car speed, a comparator for comparing the car speed with a predetermined window closing car speed, and a power supply circuit for supplying the reference voltage to the comparator in an automatic window operation mode. The power supply circuit includes a select switch provided with a manual operation contact and an automatic operation contact, a reference voltage generator connected to the automatic operation contact and adapted to generate the reference voltage in the automatic window operation mode, and a limit switch adapted to send selectively the reference voltage from the reference voltage generator to the comparator. In accordance with the present invention, the car window can be closed when the car speed exceeds the predetermined window closing car speed, thereby reducing the burden of manipulation on the driver and enabling him to concentration his attention on what he is driving.

2 Claims, 2 Drawing Sheets

SAFETY WINDOW FOR CAR

BACKGROUND OF THE INVENTION

1. Field of the Invention

The present invention relates to power windows for cars or other automobiles, and more particularly to safety windows for cars which are capable of being closed when a car speed exceeds a predetermined speed.

2. Description of the Prior Art

Conventionally, car windows comprises window opening and closing handles each of which is operatively connected to each corresponding window and manually driven to be moved upwardly and downwardly.

On the other hand, power windows have been recently developed, which accomplish the opening and the closing of car windows by using a drive motor.

However, these conventional car windows comprising the manual handle or the drive motor have various disadvantages. In the case of opening and closing a car window by using the manual handle, during the driving of car, the driver should rotate the handle with one hand, under the condition of gripping a car handle with the other hand. As a result, the driver may be burdened with the manipulation of the handle. In the case of using the drive motor, the opening and closing of car window can be easily accomplished, over the case of using the handle, in that the driver pushes simply a switch to actuate the drive motor. However, the driver may be still burdened with the manipulation of the switch, since he pushes the switch with one hand, under the condition of gripping the car handle with the other hand. Furthermore, if the driver manipulates the switch during the acceleration of car, it is difficult for him to concentrate his attention on what he is driving. As a result, there is a danger of accident.

SUMMARY OF THE INVENTION

Therefore, an object of the invention is to eliminate the above-mentioned disadvantages encountered in the prior art and to provide a safety window for a car which is capable of being automatically moved to its window closing position when the car speed exceeds a predetermined speed, so as to prevent a strong wind caused by the acceleration of car from entering the interior of car, thereby reducing the burden of manipulation on the driver and enabling him to concentration his attention on what he is driving.

In one aspect, the present invention provides a device for controlling the operation of a power window for a car, the power window including a drive motor for driving the car window between an opened position and a closed position and a control means for controlling the driving direction of the motor, the device comprising: a sensor adapted to detect the driving speed of the car; a D/A converter adapted to convert a pulse train from the sensor into an analog signal; a comparator adapted to compare the output from the D/A converter with a reference voltage indicative of a predetermined window closing car speed, the comparator having an inverting terminal connected with the output terminal of the D/A converter and a non-inverting terminal receiving the reference voltage; an A/D converter connected to the output terminal of the comparator and adapted to convert an output signal from the comparator into a digital signal, in response to the reference voltage; a switching circuit connected to the output terminal of the A/D converter and adapted to supply selectively a bias voltage to the control means, in response to an output signal from the A/D converter, and a power supply circuit adapted to supply the reference voltage to the comparator in an automatic window operation mode, the power supply circuit including a select switch provided with a manual operation contact and an automatic operation contact and adapted to select one from a manual window operation mode and the automatic window operation mode, the select switch being connected to a power source of the car, a reference voltage generator connected to the automatic operation contact and adapted to generate the reference voltage in the automatic window operation mode, and a limit switch adapted to send selectively the reference voltage from the reference voltage generator to the comparator, so that the car window can be closed when the car speed exceeds the predetermined window closing car speed.

In another aspect, the present invention also provides a device for controlling the operation of a power window for a car equipped with a liquid crystal display instrument board including a liquid crystal display circuit, the control device comprising: a decoder adapted to receive an output indicative of the car speed from a liquid crystal display drive circuit; an AND gate adapted to receive an output signal from the decoder and a reference voltage indicative of a predetermined window closing car speed; a switching circuit connected to the output terminal of the AND gate and adapted to supply selectively a bias voltage to the control means, in response to an output signal from the AND gate, and a power supply circuit adapted to supply the reference voltage to the AND gate in an automatic window operation mode, the power supply circuit including a select switch provided with a manual operation contact and an automatic operation contact and adapted to select one from a manual window operation mode and the automatic window operation mode, the select switch being connected to a power source of the car, a reference voltage generator connected to the automatic operation contact and adapted to generate the reference voltage in the automatic window operation mode, and a limit switch adapted to send selectively the reference voltage from the reference voltage generator to the AND gate, so that the car window can be closed when the car speed exceeds the predetermined window closing car speed.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
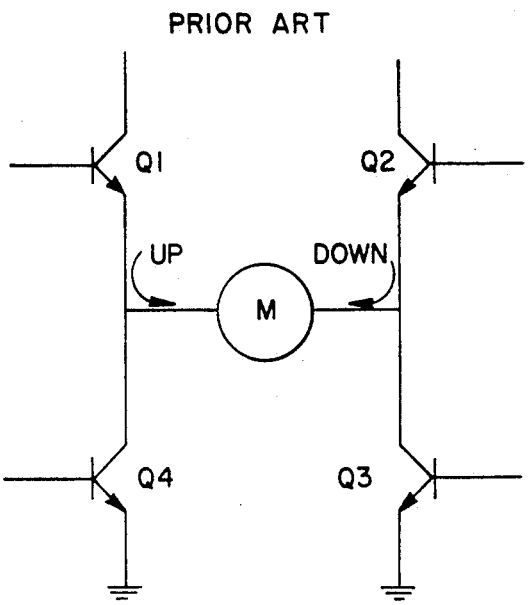
FIG. 1 is a diagram of a conventional circuit for controlling the driving of a drive motor for a power window.
Figure 2:
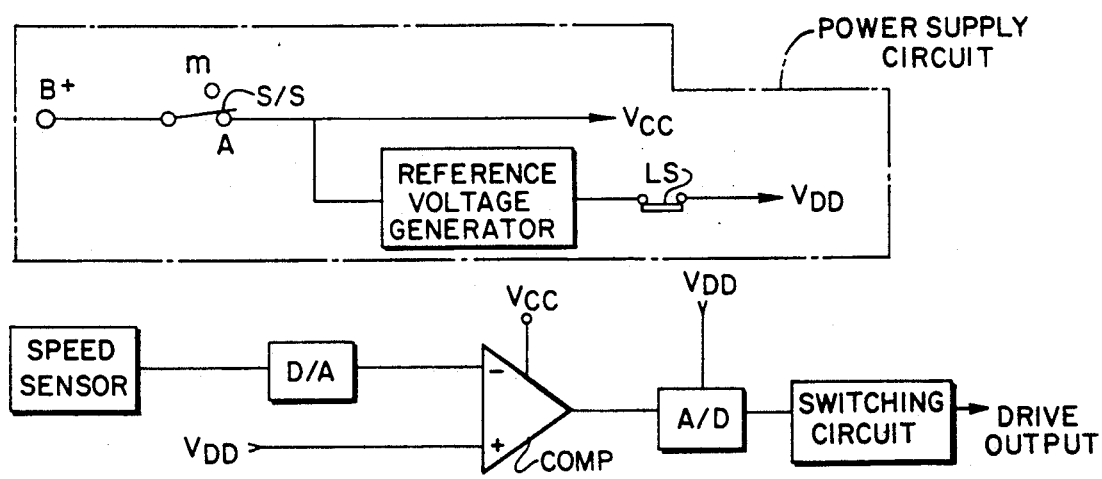
FIG. 2 is a circuit diagram of a control device for automatically closing a car window in accordance with an embodiment of the present invention.
Figure 3:
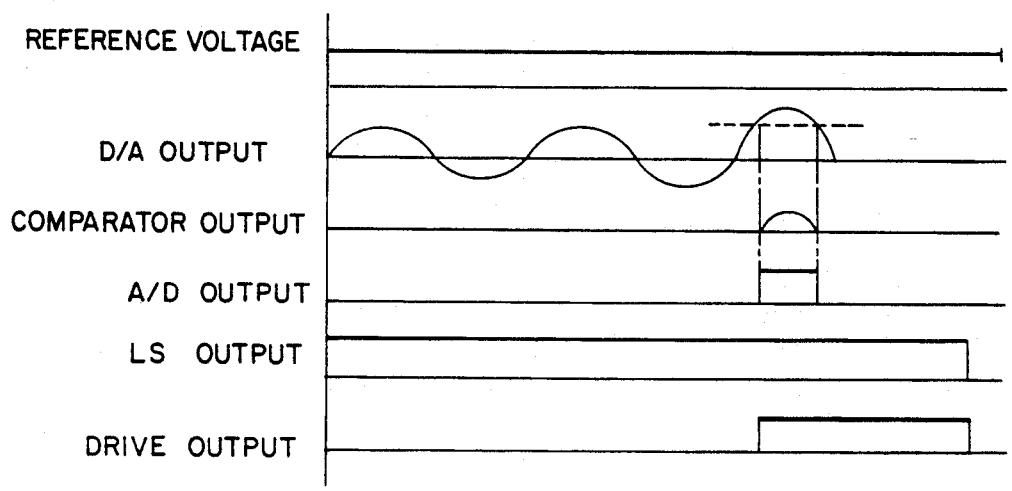
FIG. 3 is a waveform diagram of signals outputted from various parts of the control device shown in FIG. 2.

Referring to FIG. 2, there is shown a control device for automatically controlling the operation of a motor for driving a car window. The driving direction of the drive motor which is designated by the reference character "M" in FIG. 1 is controlled by a seesaw type switch adapted to switch the polarity of drive power (DC) or point symmetry-driving transistors. In case of using more improved transistors Q1 to Q4 shown in FIG. 1, the control operation according to the present invention will be more easily accomplished. The control of the driving direction of the drive motor M is well known in the technical field to which the present invention pertains.

As shown in FIG. 2, the control device according to the present invention comprises a sensor S adapted to detect the car speed, a D/A converter D/A adapted to convert a pulse train from the sensor S into an analog signal, a comparator Comp adapted to compare the output from the D/A converter D/A with a reference voltage $V_{DD}$, the comparator having an inverting terminal connected with the output terminal of the D/A converter D/A and a non-inverting terminal receiving the reference voltage $V_{DD}$, an A/D converter A/D connected to the output terminal of the comparator Comp and adapted to convert an output signal from the comparator into a digital signal, in response to the reference voltage $V_{DD}$, a switching circuit SC connected to the output terminal of the A/D converter A/D and adapted to supply a bias voltage to respective bases of transistors Q1 to Q3 in response to an output signal from the A/D converter A/D, so as to drive the motor M, and a power supply circuit E adapted to supply the reference voltage $V_{DD}$ to the comparator Comp and the A/D converter A/D in an automatic window operation mode.

The power supply circuit E comprises a select switch S/S provided with a manual operation contact m and an automatic operation contact A, so as to select one from a manual window operation mode and the automatic window operation mode, and connected to a power source B+ of car, that is, a car battery, a reference voltage generator RV connected to the automatic operation contact A and adapted to generate the reference voltage $V_{DD}$ in the automatic window operation mode, and a limit switch LS adapted to send selectively the reference voltage $V_{DD}$ from the reference voltage generator RV to the comparator Comp and the A/D converter A/D.

The limit switch LS comprises a normally closed contact which is positioned at the window full closing point. At the window full closing point, the limit switch LS cuts off the sending of the reference voltage $V_{DD}$ to the comparator Comp and the A/D converter A/D.

The switching circuit SC of the control device is parallel-connected at its output terminal to respective bases of transistors Q1 to Q3 which function to drive the drive motor M in a direction of lifting the car window. As mentioned above, the transistors, which are of a point symmetry-driving type, are equipped in a conventional power window.

Figure 4:
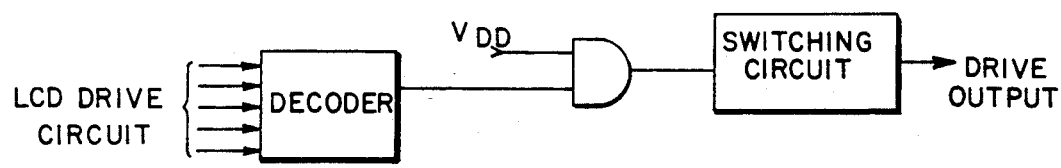
FIG. 4 is a circuit diagram of a control device for automatically closing a car window in accordance with a second embodiment of the present invention.

The present invention can be applied to a car equipped with a liquid crystal display instrument board, without any modification in the control device. Otherwise, the control device may comprise a decoder D adapted to receive a proper output (for example, an output indicative of the car speed of 20 Km) from a liquid crystal display drive circuit, an AND gate adapted to receive an output signal from the decoder D and the reference voltage $V_{DD}$ from the reference voltage generator RV, as shown in FIG. 4. The output of the AND gate is connected to the switching circuit SC. Similar to the afore-mentioned case, the switching circuit SC supplies a bias voltage to respective bases of transistors Q1 to Q3 in response to an output signal from the AND gate, so as to drive the motor M.

Now, the operation of the control device in accordance with the present invention will be described in detail.

In order to operate the power window under the control of the control device according to the present invention, the driver first shifts the operation position of the select switch S/S of the power supply circuit E such that its fixed contact is connected with the automatic operation contact A. Accordingly, the power window can be operated in the automatic window operation mode. In the automatic window operation mode, the reference voltage generator RV generates the reference voltage $V_{DD}$ and supplies it to the comparator Comp. This reference voltage $V_{DD}$ corresponds to a predetermined window closing speed and may be properly selected, depending on the desire of the driver.

On the other hand, the sensor S detects continuously the car speed, during the driving of car and sends a detect signal to the comparator Comp via the D/A converter D/A. The comparator Comp compares the detect signal with the reference voltage $V_{DD}$. If the level of the detect signal exceeds the reference voltage $V_{DD}$, that is, when the car speed exceeds the predetermined window closing car speed, the comparator Comp generates a differential output and applies it to the switching circuit SC via the A/D converter A/D, as a start signal for driving the drive motor M. As a result, the motor M is driven in the direction of closing the car window. Thus, when the car speed exceeds the predetermined window closing car speed, the car window is automatically closed, without any manual manipulation.

When the car window reaches at its full closing position, the contact of the limit switch LS is opened which is disposed at the position where it can detect the full closing of the car window. As a result, the supply of the reference voltage $V_{DD}$ is cut off, so that the output from the switching circuit SC for driving the drive motor M is shut off.

On the other hand, if the driver desires to open the car window at a car speed exceeding the window closing speed, he shifts the operation position of the select switch S/S of the power supply circuit E such that its fixed contact is connected with the manual operation contact m. Accordingly, the power window can be operated in the conventional manual window operation mode.

In case of a power window using a seesaw type switch, in place of the above-mentioned point symmetry-driving transistors, the present invention can be applied thereto, by connecting a relay adapted to open and close a power supply circuit to the switching circuit of the present invention.

As apparent from the above description, the present invention provides a safety window for an automobile which is capable of being automatically moved to its window closing position when the car speed exceeds a predetermined speed, so as to prevent a strong wind caused by the acceleration of car from entering the interior of car. Accordingly, it is possible to reduce the burden of manipulation on the driver and to concentrate the driver's attention on what he is driving. In addition, the present invention contributes to the safety of passengers.

Although the preferred embodiments of the invention have been disclosed for illustrative purpose, those skilled in the art will appreciated that various modifications, additions and substitutions are possible, without departing from the scope and spirit of the invention as disclosed in the accompanying claims.

What is claimed is:

1. A device for controlling the operation of a power window for a car, the power window including a drive motor for driving the car window between an opened position and a closed position and a control means for controlling the driving direction of the motor, the device comprising:
   a sensor adapted to detect the driving speed of the car;
   a D/A converter adapted to convert a pulse train from the sensor into an analog signal;
   a comparator adapted to compare the output from the D/A converter with a reference voltage indicative of a predetermined window closing car speed, the comparator having an inverting terminal connected with the output terminal of the D/A converter and a non-inverting terminal receiving the reference voltage;
   an A/D converter connected to the output terminal of the comparator and adapted to convert an output signal from the comparator into a digital signal, in response to the reference voltage;
   a switching circuit connected to the output terminal of the A/D converter and adapted to supply selectively a bias voltage to the control means, in response to an output signal from the A/D converter, and
   a power supply circuit adapted to supply the reference voltage to the comparator in an automatic window operation mode, the power supply circuit including a select switch provided with a manual operation contact and an automatic operation contact and adapted to select one from a manual window operation mode and the automatic window operation mode, the select switch being connected to a power source of the car, a reference voltage generator connected to the automatic operation contact and adapted to generate the reference voltage in the automatic window operation mode, and a limit switch adapted to send selectively the reference voltage from the reference voltage generator to the comparator, so that the car window can be closed when the car speed exceeds the predetermined window closing car speed.

2. A device for controlling the operation of a power window for a car equipped with a liquid crystal display instrument board including a liquid crystal display circuit, the control device comprising:
   a decoder adapted to receive an output indicative of the car speed from a liquid crystal display drive circuit;
   an AND gate adapted to receive an output signal from the decoder and a reference voltage indicative of a predetermined window closing car speed;
   a switching circuit connected to the output terminal of the AND gate and adapted to supply selectively a bias voltage to a control means for driving the car window between an opened position and a closed position, in response to an output signal from the AND gate, and
   a power supply circuit adapted to supply the reference voltage to the AND gate in an automatic window operation mode, the power supply circuit including a select switch provided with a manual operation contact and an automatic operation contact and adapted to select one from a manual window operation mode and the automatic window operation mode, the select switch being connected to a power source of the car, a reference voltage generator connected to the automatic operation contact and adapted to generate the reference voltage in the automatic window operation mode, and a limit switch adapted to send selectively the reference voltage from the reference voltage generator to the AND gate, so that the car window can be closed when the car speed exceeds the predetermined window closing car speed.

* * * * *